J. H. Snyder,
Making Railroad Chairs,
No. 1,316. Reissued June 3, 1862.
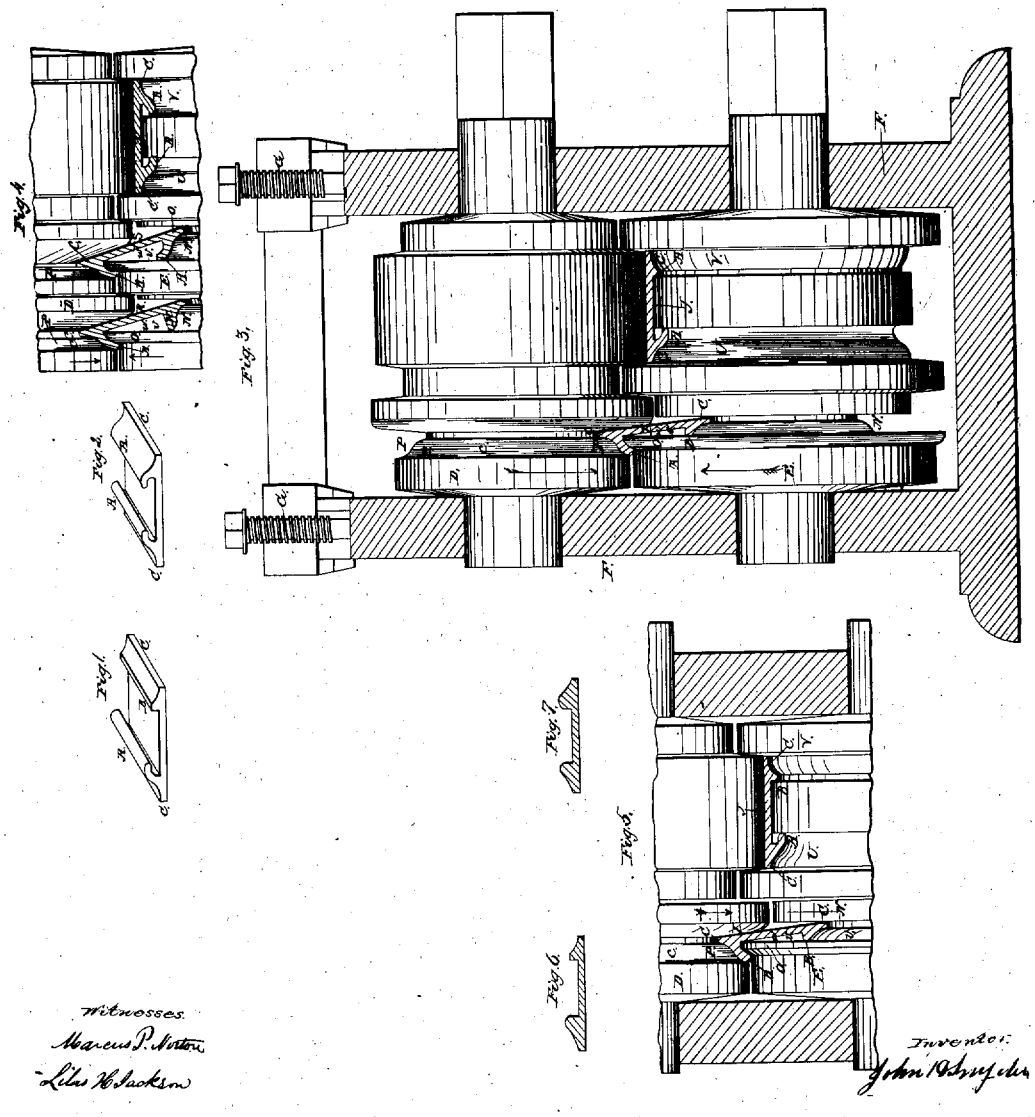
Witnesses.
Marcus P. Norton
Lilus H. Jackson
Inventor:
John H. Snyder

UNITED STATES PATENT OFFICE.

JOHN H. SNYDER, OF TROY, NEW YORK.

IMPROVEMENT IN MANUFACTURING RAILROAD-CHAIRS.

Specification forming part of Letters Patent No. 20,901, dated July 13, 1858; Reissue No. 1,316, dated June 3, 1862.

*To all whom it may concern:*

Be it known that I, JOHN H. SNYDER, of the city of Troy, county of Rensselaer, and State of New York, have invented certain new and useful Improvements in Rolling Railroad-Chairs; and I do hereby declare that the following is a full, clear, and exact description of the same, reference being hereby had to the accompanying drawings, and to the letters of reference marked thereon, which said drawings make a part of this specification.

Like letters represent and refer to like or corresponding parts.

Figures 1 and 2 are perspective views showing railroad-chairs with single and double continuous jaws or lips to secure the track-rail firmly therein, and rolled by means of the improvements hereinafter described, or by any machinery substantially the same. Fig. 1 shows a railroad-chair rolled with a jaw or lip thereon, so as to hold one side of the base of the rail, while on the opposite side thereof there is rolled a flange for the purpose of holding that side of the rail. Fig. 2 shows a railroad-chair rolled with a continuous jaw or lip upon each side thereof, and projecting inward for the purpose of holding therein each side of the base of said rail. In either case the bottom of the chair projects from and beyond the outside part of said jaws or lips to any required distance for spike-holes, or for any other purpose. Fig. 3 shows the machinery for the reduction and formation of a railroad-chair, having a continuous jaw or lip on one side thereof for the purpose of holding the base of the rail as aforesaid, and a continuous upward projecting flange, each of which is more fully hereinafter described. Fig. 4 shows the machinery for the reduction and formation of a railroad-chair having two continuous jaws or lips, one on each side thereof, and more fully described hereinafter. Fig. 5 shows machinery like Fig. 3, differing in one particular only, which is as follows, to wit: The collar or tongue *o* (more fully described hereinafter) in Fig. 3 has a sharp or cutting edge, while in Fig. 4 it has a square edge. Either may be used for the purpose of making the jaw or lip A, hereinafter more fully described. Fig. 6 shows a transverse section of a blank bar prepared for the purpose of forming a chair with a single lip by means of the machinery hereinafter described, or by means of any machinery analogous thereto. Fig. 7 shows a transverse section of a blank bar prepared for the purpose of forming two jaws or lips by means of the machinery hereinafter described, or by means of any machinery analogous thereto.

The nature of my invention and improvements consists in the mode herein described of making the continuous jaw or lips of railroad-chairs by rolling, and thereby forming the same from prepared bars, as shown at Figs. 6 and 7, by means of suitably-shaped rollers mounted and running in conjunction with each other, and hereinafter described.

It also consists in the mode of forming the continuous jaws or lips of railroad-chairs by rolling into the solid iron of a flange prepared for that purpose, as shown at Figs. 6 and 7, by means of the machinery herein described, or by any analogous means.

Having thus described the nature of my invention and improvements in rolling railroad-chairs, I will here proceed to describe the construction and operation of machinery for that purpose, which is as follows, to wit: I form the jaw or lip A of the chair, Figs. 3 and 5, by means of the rollers D and E, suitably shaped for that purpose, mounted and run together in the usual manner of mounting and running together rollers for rolling iron. The arrows indicate the direction of motion of said rollers. F, Fig 3, represents a section of the frame which holds said rollers in their proper position. G G, Fig. 3, are set-screws by which the upper roller, D, is correctly adjusted to and kept from receding too far from the lower roller E. These said rollers are provided with front guide-plates and back guard-plates, (not necessary to be shown in the drawings,) corresponding in form or shape to the blank or prepared bars, Figs. 6 and 7.

In rolling railroad-chairs having but one jaw or lip, A, I run each bar properly prepared by rolling, as shown at Figs. 6 and 7, between the said rollers D and E, or any equivalents therefor, in an edgewise position through the grooves P and N, as shown at I, Figs. 3 and 5, whereby the collar or tongue *o* is enabled to do its work. These rollers D and E may be reversed as to position, D may be the lower roller and E the upper one, if found desirable. The invention and improvements, however, would remain the same. The said roller E has upon it the said collar or tongue *o*, which said collar or tongue rolls into the solid iron of the said blank bar, prepared as shown at Figs. 6 and 7, by means of which the outside of the said lip A, Figs. 1 and 2, is made to correspond to the side *c* of the said roll D, Fig. 3, and which side may be in any shape desired. The groove N in the roller E is of a shape to fit or correspond to the flange edge of the said blank bar and to keep it in place while running through between the said rollers. The said tongue or collar *o* may be made of any form desired. It may have a sharp or cutting edge, round or square one, as the case requires, and may be in thickness to correspond to the web of the base of the rail. After the said blank bar has been passed through the said rollers and grooves P and N, it is then and thereafter passed flatwise between the rollers and grooves U and V therein, as shown at J, Figs. 3 and 5. This operation is for the purpose of straightening the base of the chairs, or the jaws or lip thereof, if such be required, and puts the entire bar thus rolled into proper shape and condition to be sawed into chairs of the right length ready for punching the spike-holes and for use. The said blank bar may be of any desired length.

In rolling railroad-chairs with two jaws or lips, A A, from blanks or bars prepared for that purpose, as seen at Fig. 7, the same is passed twice between said rollers D and E, as shown at Fig. 4. The blank bar at each time of passing said rollers is in an edgewise position. The said collar or tongue *o*, in conjunction with the said roller D and groove P therein, rolls a recess into the solid iron for the web of the base of the track-rail, thus and thereby forming the jaws or lips A A. This operation of making railroad-chairs with a continuous jaw or lip on each side thereof differs from that of making chairs with but one jaw or lip only by being passed through the said rollers edgewise twice instead of but once, and having the grooves in said rollers in shape to correspond thereto. The form or shape of the said collar or tongue *o* will vary according to any required shape of the recess to be rolled into the solid iron of the flange prepared on the blank bar and shown at Figs. 6 and 7, as aforesaid, and the form of the grooves N and P and U and V will also vary to correspond to and with any desirable change of shape or form in the said jaw or lip.

In rolling railroad-chairs, as herein described I avoid the use of a stationary core, mandrel, or former as heretofore required in the manufacture of wrought-iron railroad-chairs. In the use of said core, mandrel, or former it is very difficult to keep either in the required place between the rollers used therewith, more especially in making a chair with but one jaw or lip, and they also become rapidly heated and quickly wear down, so as to leave the chairs too narrow to receive the track-rails; and hence, with great expense and delay the said core, mandrel, or former is a great obstruction to the introduction of the blank between the drawing-rollers above and below the same, while the blank is drawn along the said core, mandrel, or former with much difficulty. By my mode a stronger, better, cheaper, and more durable railroad-chair is made than by any other way or manner of making wrought-iron chairs.

Having thus described my invention and improvements, what I claim, and desire to secure by Letters Patent, is—

1. Making the continuous jaw or lip of railroad-chairs by rolling and forming the same by means of suitably-shaped rollers mounted and running in conjunction with each other, substantially as herein described and set forth.

2. The forming of continuous jaws or lips of railroad-chairs by rolling into the solid iron of the flange on the blank bar, of which the said lips are composed, and which flange for said jaw or lips is raised upon the blank bar as aforesaid, by means of the said roller herein described and set forth, or by means of any rollers substantially the same.

In testimony whereof I have on this 20th day of May, 1862, hereunto set my hand.

JOHN H. SNYDER.

Witnesses:

MARCUS P. NORTON,
SILAS H. JACKSON.